United States Patent
Hisamoto et al.

(10) Patent No.: US 10,042,630 B1
(45) Date of Patent: *Aug. 7, 2018

(54) SOFTWARE UPDATES FROM A SECURITY CONTROL UNIT

(71) Applicant: Vivint, Inc., Provo, UT (US)

(72) Inventors: Karl Hisamoto, Walnut, CA (US); Geoffrey Wang, San Diego, CA (US); Bruce Ehlers, Lehi, UT (US)

(73) Assignee: Vivint, Inc., Provo, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/651,912

(22) Filed: Jul. 17, 2017

Related U.S. Application Data (63) Continuation of application No. 14/211,073, filed on Mar. 14, 2014, now Pat. No. 9,710,251.

(60) Provisional application No. 61/793,496, filed on Mar. 15, 2013.

(51) Int. Cl.
*G06F 9/44* (2018.01)
*G06F 8/65* (2018.01)

(52) U.S. Cl.
CPC ..................................... *G06F 8/65* (2013.01)

(58) Field of Classification Search
None
See application file for complete search history.

(56) References Cited

U.S. PATENT DOCUMENTS

| | | | |
|---|---|---|---|
| 8,543,665 B2 | 9/2013 | Ansari et al. | |
| 8,594,850 B1* | 11/2013 | Gourlay | G05B 15/02 165/11.1 |
| 2003/0182414 A1* | 9/2003 | O'Neill | G06F 8/65 709/223 |
| 2007/0079306 A1 | 4/2007 | Qumei | |
| 2008/0046878 A1* | 2/2008 | Anderson | G06F 8/68 717/168 |
| 2008/0059214 A1* | 3/2008 | Vinberg | G06F 8/61 709/221 |
| 2008/0189693 A1 | 8/2008 | Pathak | |
| 2009/0070681 A1 | 3/2009 | Dawes et al. | |
| 2011/0029965 A1* | 2/2011 | Lamba | H04L 67/34 717/172 |
| 2011/0173599 A1 | 7/2011 | Ohama et al. | |
| 2012/0198434 A1 | 8/2012 | Dirstine et al. | |
| 2012/0198435 A1 | 8/2012 | Dirstine et al. | |

(Continued)

OTHER PUBLICATIONS

Wikipedia, "Z-Wave," http://en.wikipedia.org/wiki/Z-Wave, Internet Archive dated Jan. 23, 2012.

*Primary Examiner* — S. Sough
*Assistant Examiner* — Timothy P Duncan
(74) *Attorney, Agent, or Firm* — Holland & Hart LLP (57) ABSTRACT

The present systems and methods relate to approaches for distributing software (such as firmware updates) in a security system that includes a control unit. The control unit may be configured to communicatively connect to a plurality of electronic devices, including sensors for the security system. The control unit may also communicatively connect to a remote server. The control unit receives firmware for target electronic devices from the remote server, determines which electronic devices are target electronic devices for which the firmware is intended, and sends the firmware to the target electronic devices.

20 Claims, 7 Drawing Sheets

(56) References Cited

U.S. PATENT DOCUMENTS

2013/0205288 A1* 8/2013 Sohm ................ G05B 15/02
717/168

* cited by examiner

SOFTWARE UPDATES FROM A SECURITY CONTROL UNIT

CROSS REFERENCES

This application is a continuation of U.S. patent application Ser. No. 14/211,073 entitled "SOFTWARE UPDATES FROM A SECURITY CONTROL UNIT," which was filed Mar. 14, 2014, which claims priority from U.S. Provisional Patent Application No. 61/793,496 entitled "SOFTWARE UPDATES FROM A SECURITY CONTROL UNIT," which was filed Mar. 15, 2013.

TECHNICAL FIELD

This disclosure relates generally to security systems and, more specifically, to performing software updates for electronic devices from the control unit of the security system.

BACKGROUND

Security systems are widely used to protect property and provide personal safety. Security systems generally include a control unit that controls the overall operation of the system, one or more keypads providing user access to the system, and various detectors and sensors.

Security systems may generate an alarm in response to any number of events, such unauthorized entry, fire, medical emergency or manual alarm activation. The security system may be associated with a service that remotely monitors the status of the security system. Thus, if the security system generates an alarm, a notification signal may be transmitted via a wired and/or wireless communications link to a monitoring system. Upon receiving the notification, security service personnel for the monitoring system may attempt to contact the property owner or other party at the facility to verify the alarm. If it is appropriate to do so, a security service representative may, upon confirmation of the alarm, contact an emergency response agency such as the police department, the fire department, an emergency medical team, or other appropriate entity.

Security systems are also playing a larger role in building automation, and may include a control unit that provides building automation features. At the same time, more and more devices are provided with microprocessors and the ability to communicate information to other devices. For example, appliances, entertainment devices (such as televisions and DVD/BLU-RAY™ players), lighting controllers, and other devices may be equipped with processors and communications devices. As a result, the control unit of the security system may communicate with the security sensors, and also communicate with numerous other devices through either wired or wireless connections.

The abundance of devices using processors also comes with additional complications. Most of these devices implement some form of firmware that contains the program code and data used in operation of the device. It can be a notoriously difficult and laborious process to download and install updates to the firmware on the relevant devices. This complication is only growing as the number of devices with firmware installed increases. As a result, many consumers do not update the firmware on many of their devices and forgo the benefits associated with the updates.

SUMMARY

Disclosed herein are devices and approaches to providing software updates to electronic devices in communication with a control unit for a security system. The control unit may include instructions for communicatively connecting to electronic devices, including sensors for the security system. The control unit may also communicatively connect to a remote server and receive firmware to be installed on electronic devices. The control unit may determine which of the electronic devices are electronic devices for which the firmware is intended and send the firmware to the electronic devices. The control unit may send the firmware as object code or source code to the electronic devices. In one embodiment, the control unit sends the firmware wirelessly using the Z-WAVE® protocol.

The control unit may send the firmware directly to the target electronic devices, or use a multi-hop approach by which electronic devices in direct communication with the control unit receive the firmware and forward the firmware to an electronic device not in direct communication with the control unit. The control unit may also delay the installation of the firmware on security sensors until the security system is in an unarmed state.

The control unit may also include instructions for validating that the target electronic devices successfully installed the firmware and for restoring the target electronic devices that fail validation to a previous firmware version.

In certain embodiments, the control unit also includes instructions for discovering electronic devices that are capable of wirelessly communicating with the control unit and registering the discovered electronic devices. The control unit may also be configured to identify firmware sources for the registered electronic devices.

Also disclosed is a security system that includes a plurality of sensors that are communicatively connected to a control unit for the security system. The system may also include a remote server that includes firmware for one or more target sensors of the plurality of sensors. The control unit may be configured to wirelessly connect to the sensors, receive the firmware from the remote server, and wirelessly transmit the firmware to the target sensors.

The target sensors may be configured to receive the firmware from the control unit and to install the firmware while the security system is unarmed. The target sensors may also transmit a success indicator to the control unit if the target sensor successfully installs the firmware. In certain embodiments, the target sensors store a previous version of the firmware and restore to the previous firmware version if the target sensor fails to successfully install the firmware. The target sensor may report any failure to successfully install the firmware to the control unit, which may, in turn, report the failure to a remote server.

Also disclosed is a method that comprises receiving, from a remote server, a firmware update to be installed on one or more devices in communication with a control unit in a security system, identifying the targets devices that are intended recipients of the firmware update, and sending the firmware update to the target devices. Where the target devices are security sensors, the method may involve waiting until the security system is in an unarmed state before sending the firmware update.

Other aspects, as well as features and advantages of various aspects, of the present invention will become apparent to those of skill in the art though consideration of the ensuing description, the accompanying drawings and the appended claims.

DETAILED DESCRIPTION

Referring in general to the accompanying drawings, various embodiments of the present invention are illustrated to show the structure and methods for installing a component within a system, such as a security system. Common elements of the illustrated embodiments are designated with like numerals. It should be understood that the figures presented are not meant to be illustrative of actual views of any particular portion of the actual device structure, but are merely schematic representations which are employed to more clearly and fully depict embodiments of the invention.

The following provides a more detailed description of ways to implement the present invention and various representative embodiments thereof. In this description, functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present invention may be practiced by numerous other solutions. For the most part, details concerning timing considerations and the like have been omitted where such details are not necessary to obtain a complete understanding of the present invention and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

Figure 1:
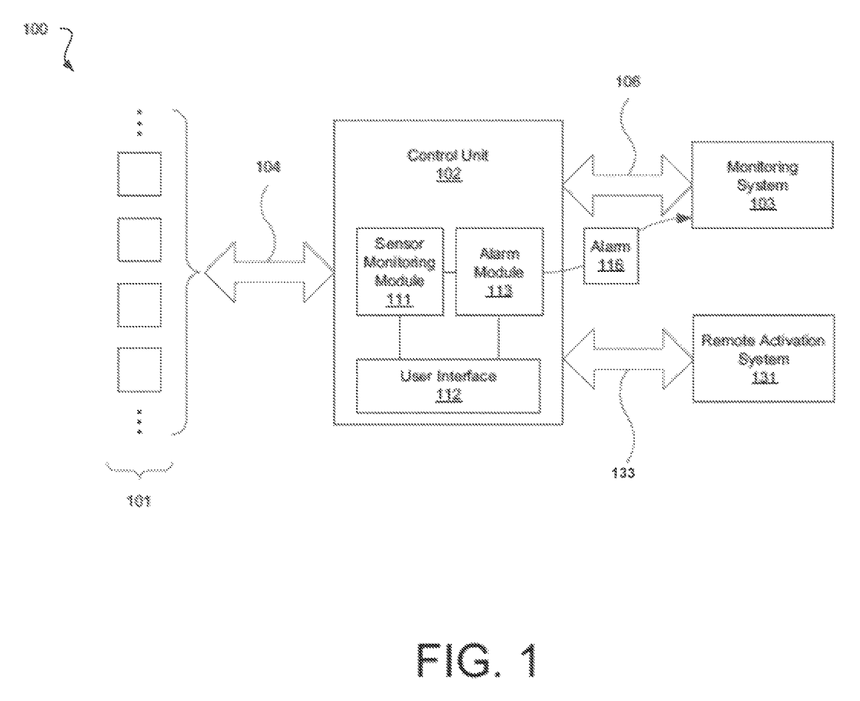
FIG. 1 illustrates one embodiment of a security system.

FIG. 1 illustrates an embodiment of a security system 100, which may also be referred to as an "alarm system." The security system 100 includes sensors 101 (also referred to as security sensors), a control unit 102, monitoring system 103, and remote activation system 131. Communication links 104 (which may be a combination of wired and wireless communication links) couple sensors 101 to control unit 102. Wired communication links can include circuit loops that are either detected as closed or open. In some embodiments, sensors 101 and control unit 102 are located in the same facility, such as in the same residence or in the same building. Communication link 106 (which may be a wired telephone connection, wired or wireless network connection, cellular connection, etc., or combination thereof) may couple the control unit 102 to monitoring system 103. In other embodiments, the system shown in FIG. 1 may be implemented without a monitoring system 103. In certain embodiments, the monitoring system 103 may communicate with multiple control units 102 belonging to other security systems.

Sensors 101 monitor for certain events and report relevant events to the control unit 102. Sensors 101 may include any of a variety of different types of sensors, such as door and window sensors, motion sensors, glass break sensors (e.g., sensors that detect a physical break or detecting the sound of a glass break), etc. The control unit 102 may be configured to monitor sensors 101 for alarm conditions via communication links 104 and to relay alarms to the monitoring system 103 via communication link 106. The sensors 101 may, in response to detecting an alarm condition, send an alarm condition message to the control unit 102.

In certain embodiments, one or more of the sensors 101 may monitor conditions other than security-related conditions. For example, one or more sensors may monitor energy usage within the home, temperature, ambient light levels, and other conditions. The control unit 102 may receive the measurements from the sensors 101 and provide them to the user of the system or use them in providing building automation services.

Control unit 102 may include sensor monitoring module 111, user interface 112, and alarm module 113. Sensor monitoring module 111 is configured to monitor sensors 101. Sensors 101 can sense and/or indicate a change in their physical surroundings (e.g., a normally closed connection becomes open, a signal indicating that the sound of breaking glass was detected, etc.) which may be indicative of an unauthorized access, fire, or other event. The sensors 101 may communicate messages on communication links 104. For example, a circuit connected to a door sensor 101 can transition from closed to open (or to a resistance exceeding a pre-determined resistance threshold) indicating that a door has been opened. A motion sensor 101 can send an electrical signal indicative of detected motion. Sensor monitoring module 111 may monitor communication links 104 for alarm condition messages sent from sensors 101. Upon sensor monitoring module 111 receiving an alarm condition message signaling occurrence of an alarm condition, sensor monitoring module 111 may send a signal to alarm module 113.

The alarm module 113 may validate the alarm condition has occurred before communicating with the monitoring system 103 or generating an alarm using the alarm 116. For example, the alarm module 113 may validate an alarm condition indicating that a window is open when the security system is on, but may not validate the same alarm condition when the security system is off.

The alarm module 113 may cause an alarm 116 to generate an alarm in response to validating the alarm condition. The alarm 116 may provide an audio signal (such as beeping, audio instructions, or other suitable audio), a visual signal (such as a flashing light) or a combination thereof to alert a user to the alarm condition. Where the control unit 102 is associated with one or more controllers providing building automation features, the control unit 102 may also use those features to provide an alarm. For example, the control unit 102 may flash one or more interior lights as part of the alarm.

User interface 112 can include an input interface and an output interface. The input interface can comprise a physical input interface or virtual input interface that may include a numeric key pad (e.g., for entering a disarm code, etc.), sensor activation buttons, physical duress buttons, or other input/output devices. The input interface can include a condenser for receiving audio input and/or communicating with monitoring system 103. The output interface may include an output display device that displays system status, such as armed and disarmed, sensors/zones that have detected change in physical surroundings, and other relevant information. The output interface can also include a speaker that audibly outputs information similar to that displayed on the output display device. The speaker can also be used by monitoring system 103 to communicate with a user of control unit 102. Other input/output approaches may also be implemented as part of the user interface 112.

The control unit 102 may also communicate over a communication link 133 with a remote activation system 131. The remote activation system 131 may allow a user to interact with the control unit 102 remotely. For example, the user may be able to arm and disarm the security system 100 from a mobile device such as a cellular phone using the remote activation system 131. In one embodiment, the remote activation system 131 includes software installed on the mobile device of the user.

The control unit 102 may thus provide the functionality of a security system and a building automation system. A building automation system may automate a home, a work place, a hotel, or another type of building or space.

Figure 2:
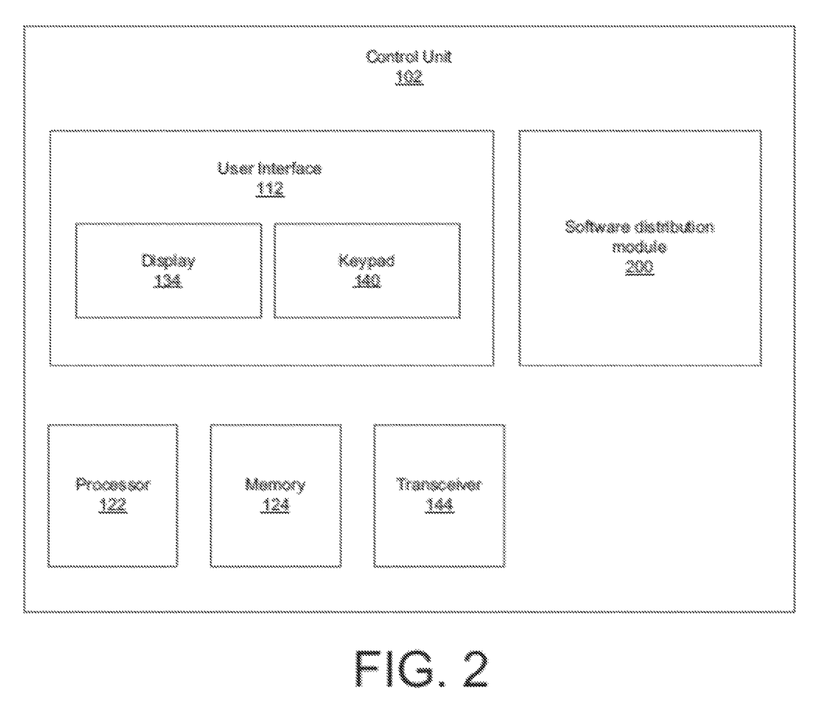
FIG. 2 is a block diagram of an embodiment of a control unit of a security system that includes a software distribution module.

FIG. 2 is a block diagram of one embodiment of a control unit 102. Control unit 102 may include a processor 122, memory 124, transceiver 144, and user interface 112. User interface 112 may include various input/output (I/O) devices, such as a display 134, which may comprise a touch screen, and keypad 140. Control unit 102 may further include a transceiver 144 for receiving and transmitting data over a network. It is noted that a "communication interface" as referred to herein may comprise transceiver 144 and user interface 112. The control unit 102 may be capable of communicating over more than one network; for example, the control unit 102 may be capable of communicating using the ZIGBEE™ protocol, Z-WAVE® protocol, BLUETOOTH™ protocol, Wi-Fi protocol, Global System for Mobile Communications (GSM) standard, or other.

Generally, control unit 102 may operate under control of an operating system stored in memory 124, and interface with a user to accept inputs and commands and to present outputs through user interface 112. Control unit 102 may also implement a compiler (not shown) which allows one or more application programs (not shown) written in a programming language to be translated into processor-readable code. Instructions implementing an application program may be tangibly embodied in a computer-readable medium. Further, an application program may include instructions which, when read and executed by processor 122, cause processor 122 to perform the steps necessary to implement and/or use embodiments of the present disclosure. It is noted that an application program and/or operating instructions may also be tangibly embodied in memory 124 and/or data communications devices, thereby making a computer program product or article of manufacture according to an embodiment the present disclosure. As such, the term "application program" as used herein is intended to encompass a computer program accessible from any computer readable device or media. Furthermore, portions of the application program may be distributed such that some of the application program may be included on a computer readable media within control unit 102, and some of the application program may be included in a remote device, such as a remote computer.

The control unit 102 may include a software distribution module 200. The software distribution module 200 may be an application program stored in memory 124 and executed by the processor 122. The software distribution module 200 may be configured to download software for one or more electronic devices communicatively coupled to the control unit 102, and to cause the control unit 102 to send the software to the appropriate recipient electronic devices. As used herein, "software" is used broadly to refer to all varieties of executable instructions, including firmware, updates, replacement code, application software, operating system software, and others. The software distribution module 200 may determine which electronic devices the software is intended for, transit the software to those target electronic devices, and cause the target electronic devices to install the software. In this manner, the software distribution module 200 may help ensure that the software of electronic devices connected to the control unit 102 is kept up-to-date and make the process easier for the user.

Figure 3:
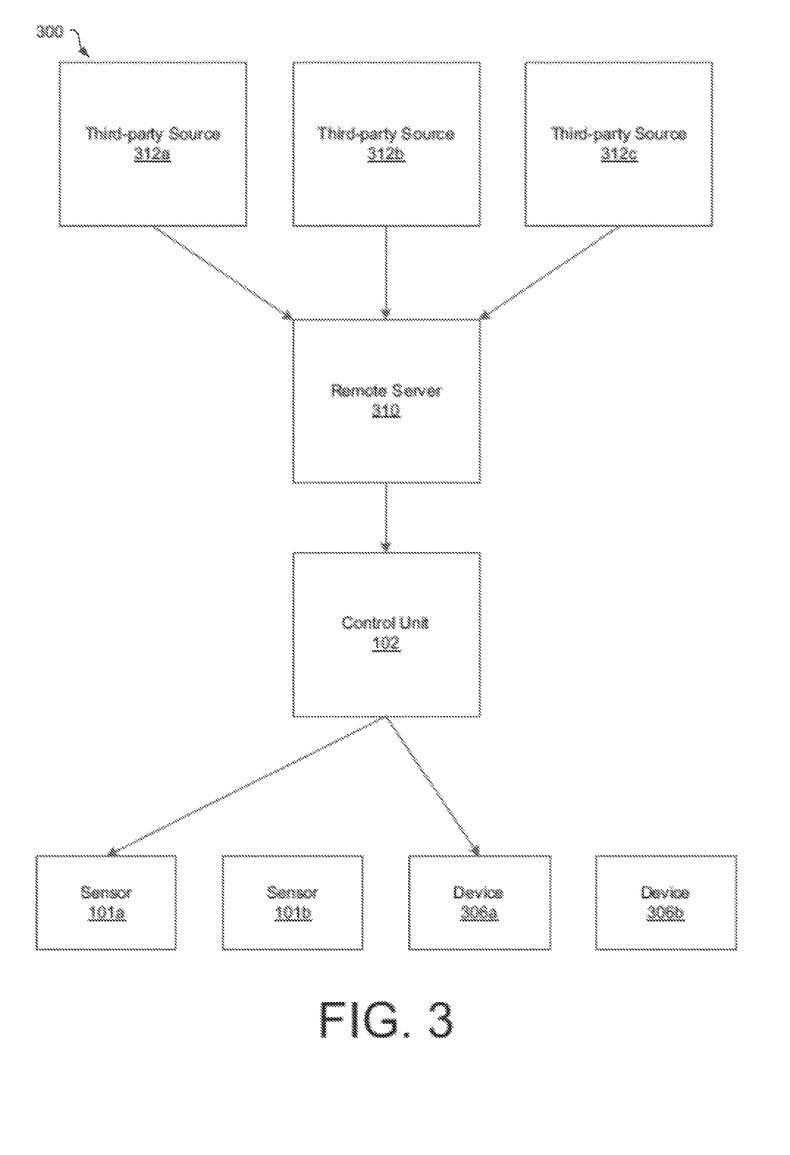
FIG. 3 is a schematic block diagram illustrating one embodiment of a system including third-party sources of software, a remote server, a control unit, and electronic devices.

FIG. 3 illustrates one embodiment of a system 300 including third-party sources 312a-c of software, a remote server 310, a control unit 102, sensors 101a-b, and devices 306a-b. The control unit 102 may be configured to communicate with the sensors 101a-b and the devices 306a-b, as well as the remote server 310. The remote server 310 may be configured to communicate with the third-party sources 312a-c.

The third-party sources 312a-c are electronic devices that make software for electronic devices available for download. The third-party sources 312a-c may implement websites that include links to the appropriate software. For example, a company that manufactures one or more electronic devices may set up a website from which the user can find information about the electronic device and download the latest version of the firmware for the electronic device.

The remote server 310 can be one or more physical devices providing software services to the control unit 102. The remote server can refer to a physical machine, software running on a physical machine, a virtual machine, or other combination for providing software services to a number of control units 102. The remote server 310 and the control units 102 may communicate over a wireless connection, a wired connection, or both. In certain embodiments, the remote server 310 is associated with the monitoring system 103 and provides a number of services for the control unit 102.

The remote server 310 may be configured to communicate with the third-party sources 312a-c and to provide software to the control unit 102. In one embodiment, the remote server 310 downloads the software from the third-party sources 312a-c and stores the software in an associated database. The control unit 102 may, in turn, request the software from the remote server 310 and receive a copy of the software from the remote server 310. In another embodiment, the remote server 310 stores one or more links to the software available from the third-party sources 312a-c and directs requests from the control unit 102 to the appropriate third party source 312a-c. The remote server 310 may transparently redirect the requests such that the ultimate source of the software is hidden from the control unit 102.

The control unit 102 receives the software from the remote server 310, a third-party source 312a-c, or some other source, and determines which devices connected with the control unit 102 are intended recipients of the software.

The control unit 102 then sends the software to the intended recipient devices (also referred to herein as "electronic devices"). The sensors 101*a-b* and devices 306*a-b* are examples of electronic devices which may be communicatively connected to the control unit 102 and may benefit from access to software. The sensors 101*a-b* may be security sensors, home automation sensors (such as temperature sensors, light sensors, etc), or other types of sensors. The devices 306*a-b* may be any variety of consumer electronic device such as a television, a DVD/BLU-RAY™ player, a building automation controller, a mobile computing device, or another type of consumer electronic device.

In the depicted FIG. 3, the control unit 102 may receive software in the form of two firmware updates. The control unit 102 may determine that one firmware update is intended for the sensor 101*a*, and the second firmware update is intended for the device 306*a*. The control unit 102 may send the first firmware update to the sensors 101*a* and the second firmware update to the device 306*a*, where the firmware updates will be installed. In this manner, the system 300 may benefit from a simple approach to providing firmware updates to the electronic devices that are communicatively connected to the control unit 102.

In certain embodiments, the control unit 102 may also ensure that the installation of the software, firmware, or other update sent by the control unit 102 is installed in a synchronized manner. In one embodiment, the control unit 102 ensures the synchronized installation of updates for the sensors 101*a-b*. As used herein, synchronization refers to causing installation to occur at substantially the same time. Ideally, the installation also occurs at substantially the same rate. The control unit 102 may, for example, push out the updates to the sensors 101*a-b* and also provide a time at which the sensors 101*a-b* are to install the update. As a result, the sensors 101*a-b* may wait and update at the same time such that communication does not become interrupted. For certain electronic devices, it may be important that the electronic devices shut down and restart at substantially the same time in order to prevent loss of communication.

Figure 4:
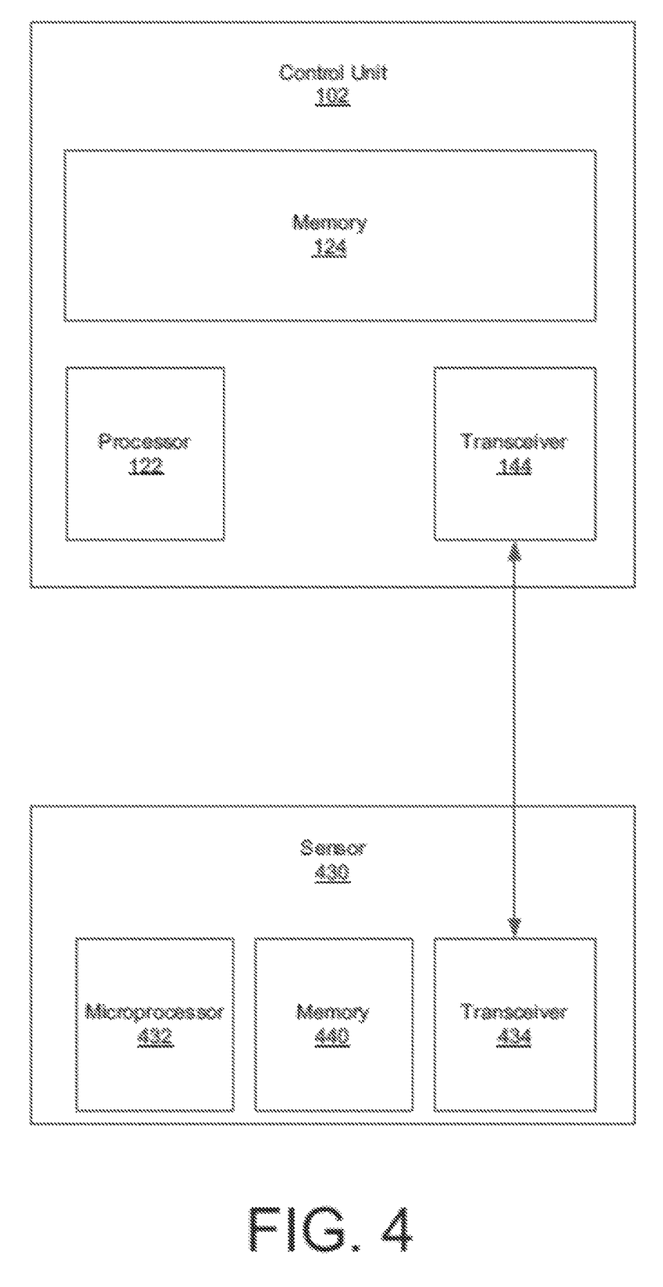
FIG. 4 is a schematic block diagram illustrating one embodiment of a control unit in communication with a sensor.

FIG. 4 illustrates one embodiment of a control unit 102 in communication with a sensor 430. While FIG. 4 illustrates a sensor 430, the discussion is applicable to any variety of electronic device that may use software.

The control unit 102 is illustrated as including memory 124, a processor 122, and a transceiver 144. The control unit 102 may, of course, include additional components not shown here for simplicity. The memory 124 may be read-only memory (ROM), Flash memory, or other suitable form of memory (and combinations thereof). The memory 124 stores one or more applications as described above. In one embodiment, the memory 124 stores instructions for communicatively connecting the control unit 102 to a plurality of electronic devices, such as the sensor 430. The control unit 102 may also store instructions for communicatively connecting to a remote server; in one embodiment, the remote server may be a server that aggregates software from other sources, as discussed in connection with FIG. 3. In other embodiments, the remote server is a server associated with the third-party source itself.

The control unit 102 may request software that is a firmware update for the sensor 430 from the remote server. In other embodiments, the remote server automatically pushes a notification to the control unit 102 when the firmware update is available, or automatically sends the firmware update to the control unit 102. The control unit 102 receives the firmware update for the sensor 430 and may store it temporarily in the memory 124. Where the control unit 102 is communicatively connected to multiple electronic devices, the control unit 102 may also determine which of the electronic devices are target electronic devices for which the firmware update is intended. In FIG. 4, the sensor 430 is the target electronic device.

In other embodiments, the firmware update may be intended for multiple electronic devices. For example, a firmware update for sensors in a security system may need to be installed on multiple sensors. In such an embodiment, there may be more than one target electronic device.

The control unit 102 is further configured to send the firmware update to the sensor 430. In one embodiment, the control unit 102 includes a compiler. The control unit 102 may receive the firmware update as source code, compile the firmware update to object code, and send the firmware update as object code. In other embodiments, the control unit 102 may receive the firmware update as object code. In another embodiment, the control unit 102 sends the firmware update as source code to the sensor 430, and the sensor 430 uses an onboard compiler to compile the source code to object code.

The control unit 102 may send the firmware update using the control unit's transceiver 144, and the sensor 430 may receive the firmware update using the sensor's transceiver 434. The hardware and protocol used to transmit the firmware update may vary from one sensor to another; in one embodiment, the control unit 102 and the sensor 430 have a wireless connection; in another embodiment, the control unit 102 and the sensor 430 have a wired connection. The control unit 102 and the sensor 430 may communicate using Wi-Fi, BLUETOOTH™, Ethernet, or other appropriate communications technology. The control unit 102 may use the 802.15.4 standard and/or transmission protocols that extend that standard, such as the ZIGBEE™ transmission protocol, to communicate the firmware update to the sensor 430.

The sensor 430 may be configured to receive the firmware update from the control unit 102 and to install the firmware update on the sensor 430. In one embodiment, the sensor 430 is configured to save a copy of the previous firmware version before installing the firmware update. The microprocessor 432 may, for example, store a copy of the previous firmware version in the memory 440. In another embodiment, the control unit 102 stores a copy of the previous firmware version in the memory 124 of the control unit 102.

The sensor 430 may be configured to transmit a success indicator to the control unit 102 in response to the sensor 430 successfully installing the firmware update. The sensor 430 may, for example, install the firmware update and execute one or more tests to validate the installation of the firmware update. The sensor 430 may, in response to the installation being validated, send an acknowledgement message to the control unit 102 that informs the control unit 102 that the firmware update was successfully installed. The sensor 430 may also send a message in the event that the firmware update fails. The control unit 102, in one embodiment, may assume a failure if an acknowledgement message is not received in a certain period of time.

The sensor 430 may be configured to restore the previous version of the firmware in response to the firmware update failing to install correctly on the sensor 430. In one embodiment, the microprocessor 432 accesses the previous version of the firmware from the memory 440 and causes the sensor 430 to restore using the previous version of the firmware. In another embodiment, the control unit 102 retrieves the previous version of the firmware from the memory 124 and sends the previous version of the firmware to the sensor 430 for installation. The control unit 102 may send the previous version of the firmware if it does not receive an acknowledgement message from the sensor 430 indicating that the firmware update was successfully installed.

The control unit 102 may be further configured to report to a remote server the success or failure of the installation process for the firmware update. The remote server may instruct the control unit 102 to attempt another installation, or to cease installation attempts of the firmware update. For example, if a large number of control units 102 report an error in the installation process, the remote server may conclude that the software update itself is faulty. The remote server may alert a human user of the errors, generate a report to the entity that created the firmware update, or take other appropriate action.

Figure 5A:
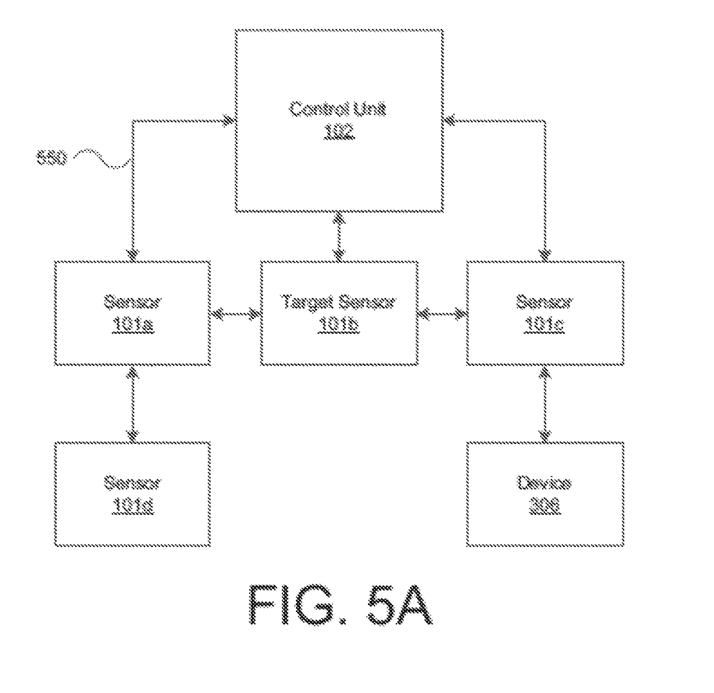
FIGS. 5A and 5B are schematic block diagram illustrating possible communications paths for software between the control unit and one or more electronic devices.

FIG. 5A illustrates a system including a control unit 102, sensors 101a-d, and device 306. In the depicted embodiment, the control unit 102 receives firmware for intended for the sensor 101b. FIG. 5A also illustrates communications links 550 between the components in the system. The communications links 550 may be any of a variety of transmission protocols including Z-WAVE®, Wi-Fi, BLUETOOTH™, and others. In certain embodiments, the type of communication link 550 may vary between devices; for example, the sensors 101a-d may connect with the control unit 102 using Z-WAVE®, while a television connects with the control unit 102 using Wi-Fi.

Figure 5B:
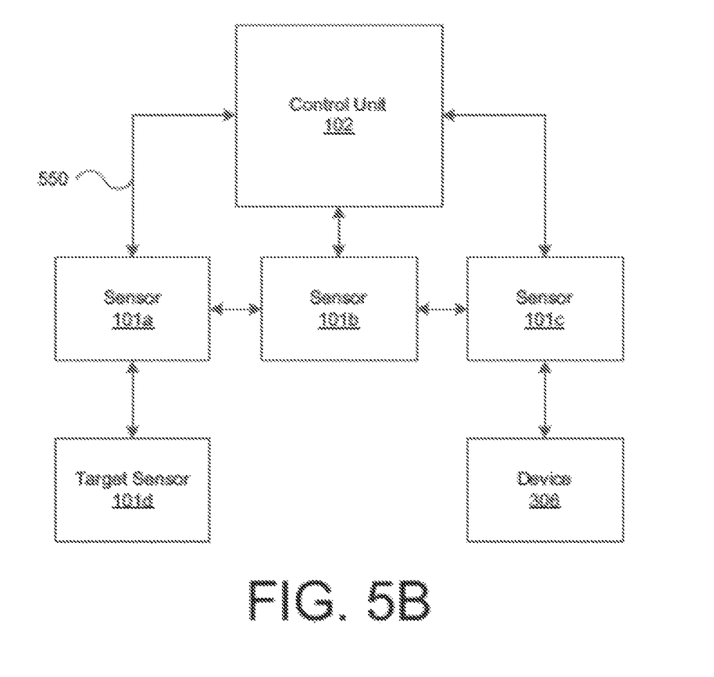

The sensors 101a-d and the device 306 may be organized as a mesh network. In the embodiment shown in FIG. 5A, the control unit 102 has a direct connection to the target sensor 101b. In such an embodiment, the control unit 102 may send the firmware update to the target sensor 101b directly. FIG. 5B shows the control unit 102, sensors 101a-d, and device 306, but with the sensor 101d the target sensor. In FIG. 5B, the control unit 102 does not have a direct communication link 550 to the target sensor 101d. The control unit 102 may send the firmware update to one or more of the sensors 101a-c with which the control unit 102 has a communication link 550. The sensor 101a, which has a communications link 550 with the target sensor 101d, may then forward the firmware update to the target sensor 101d. Messages and communications may similarly be originated by the target sensor 101d and shared with the control unit 102.

In certain embodiments, different devices in the system may communicate using different protocols. For example, the control unit 102 and the sensor 101c may communicate over the communication link 550 using the Z-WAVE® protocol, while the sensor 101c and the device 306 communicate over the communication link 550 using Wi-Fi. In such embodiments, the sensor 101c (or other comparable device) may also act as a gateway device that interfaces the two devices using the different protocols.

Figure 6:
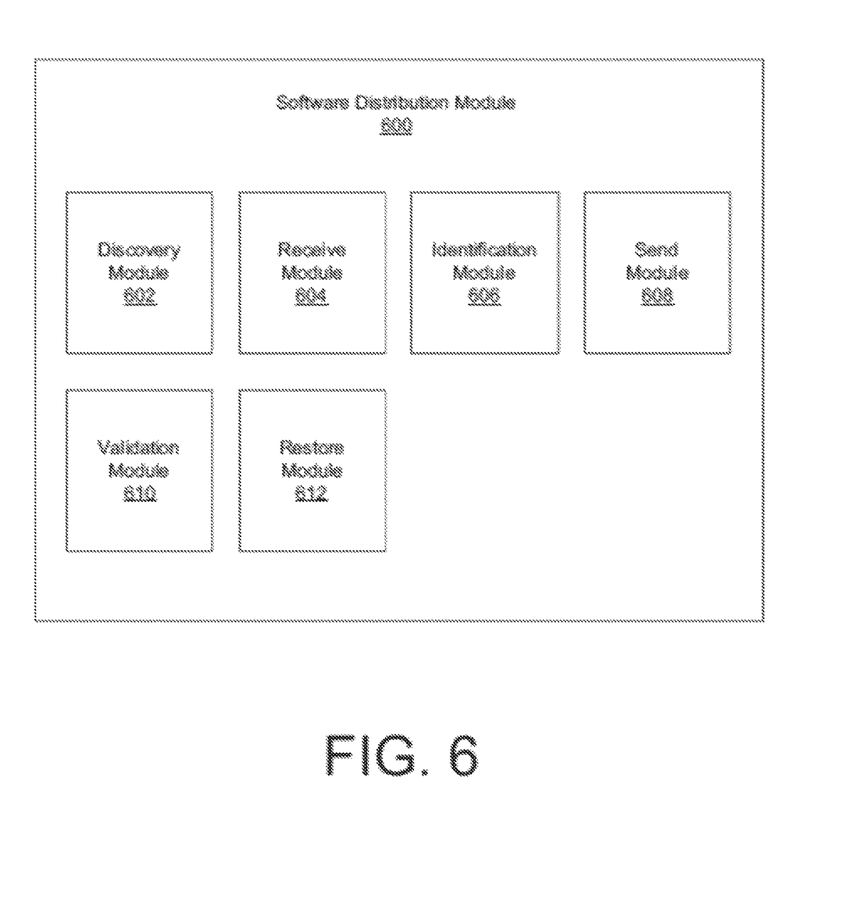
FIG. 6 is a schematic block diagram illustrating one embodiment of a software distribution module.

FIG. 6 illustrates one embodiment of a software distribution module 600. The software distribution module 600 may be implemented on a control unit; in other embodiments, components of the software distribution module 600 are distributed across various devices, including the control unit, the sensors or other electronic devices, and the remote server.

The software distribution module 600 may include a discovery module 602. The discovery module 602 may be configured to discover electronic devices that are capable of wirelessly communicating with the control unit. In one embodiment, the discovery module 602 uses Universal Plug and Play (UPnP) protocols that facilitate the discovery of electronic devices. The discovery module 602 may also allow electronic devices to register with the control unit using, for example, pairing processes like that used in Bluetooth.

The discovery module 602 may further receive user input as part of the discovery process. The discovery module 602 may discover various electronic devices and request that the user confirm that the electronic devices discovered should be allowed to communicate with the control unit. The discovery module 602 may also have the user identify and/or confirm the software source for each of the registered electronic devices.

The discovery module 602 may maintain a data structure storing identifying information for the electronic devices in communication with the control unit. The discovery module 602 may store a media access control (MAC) address, a name for the electronic device, a firmware version, and other information for the discovered electronic devices. In certain embodiments, the discovery module 602 may share the data structure with a remote server, allowing the remote server to know which electronic devices are in communication with the control unit and what firmware to provide to the control unit.

The software distribution module 600 may also include a receive module 604 for receiving software to be installed on target electronic devices communicatively connected to the control unit. The receive module 604 may receive the software as source code and compile the source code to generate object code that can be sent to the target electronic devices. The receive module 604 may also be configured to store the software in a database on the control unit such that a local copy of the software is maintained on the control unit. In one embodiment, the receive module 604 may also store information about the software in a database. The information may include, for example, the release date of the software, the version number, the publisher, the target electronic device, and other information.

The software distribution module 600 may also include an identification module 606 for determining which electronic devices connected to the control unit are intended recipients of the software. In one embodiment, the identification module 606 compares data about the electronic devices created by the discovery module 602 with information for the software in order to determine which electronic devices are target electronic devices for which the firmware is intended.

The send module 608 may be configured to send the software to the target electronic devices identified by the identification module 606. In one embodiment, the send module 608 multi-casts the software where more than one electronic device is intended to receive and install the software. In another embodiment, the send module 608 sends the software to all target electronic devices communicatively connected to the control unit, and each electronic device is responsible for determining whether to install the software.

In one embodiment, the send module 608 selects an appropriate time to send the software to the target electronic devices for installation. For example, the send module 608 may wait until a low-use period (such as during the night) to send a firmware update to an appliance. The send module 608 may wait until the security system is in an unarmed state before sending a firmware update to security sensors. The send module 608 may also consider additional conditions; for example, the send module 608 may query the battery status of an electronic device that operates on battery power to ensure that the device has sufficient battery power to successfully install the software. This may be particularly important during firmware installation, where failure during the installation process may render the sensor unusable.

The validation module 610 may be configured to validate that the electronic devices that received the software successfully installed the software. In one embodiment, the validation module 610 validates the installation if the control unit receives an acknowledgement or other message from the sensor indicating that the installation was successful. The validation module 610 may execute one or more tests to confirm functionality of the electronic device after the electronic device installs the software.

The restore module 612 may restore an electronic device to a previous version of the software if the installation of the software fails to install properly or causes problems with the electronic device. The restore module 612 may store a known good copy of software for each of the electronic devices before the software is installed on the electronic devices. In one embodiment, the user can, at any time, choose a previous version of the software and cause the control unit to initiate a process for installing that previous version. This approach may provide the user with more control over the maintenance of the software and provide additional assurance of stability.

Figure 7:
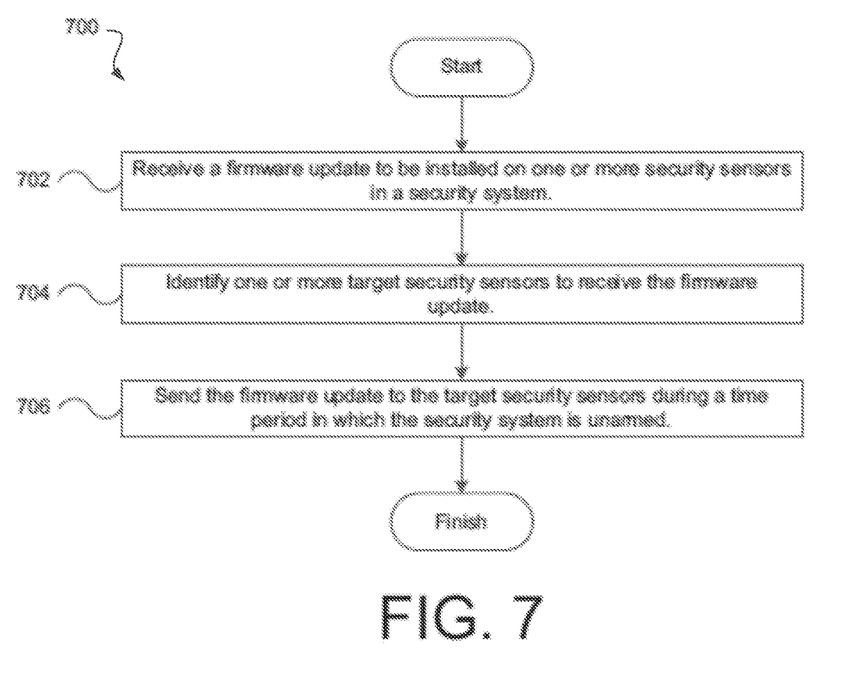
FIG. 7 is a flow chart diagram illustrating one embodiment of a method for distributing software from a control unit.

FIG. 7 illustrates one embodiment of a method 700 for providing firmware updates from a control unit. The method 700 begins at reference numeral 702 with receiving a firmware update to be installed on one or more security sensors in a security system. The firmware update may be a new copy of the firmware, or one or more components of the firmware that replace only a portion of the existing firmware on the security sensors. The firmware update may be sent by a remote server and received by the control unit.

The method 700 may further involve, at reference numeral 704, identifying one or more target security sensors to receive the firmware update. In certain embodiments, the firmware update may be intended for only a subset of the security sensors in the security system. In other embodiments, the firmware update may be intended for all security sensors in the security system.

The method 700 may also involve, at reference numeral 706, sending the firmware update to the target security sensors during a time period in which the security system is unarmed. The control unit may unicast the firmware update to each target security sensor or multicast the firmware update to all target security sensors. The control unit may also broadcast the firmware update to all security sensors and allow each security sensor to determine whether to install the firmware update.

In certain embodiments, the method 700 also involves receiving device firmware updates for electronic devices, other than security sensors, that are in communication with the control unit. The method may similarly involve sending the device firmware updates to the target devices affected by the firmware update.

In certain embodiments, the method 700 also includes monitoring third-party servers for firmware updates and automatically downloading the device firmware update if new device firmware updates are added. The method 700 may also, as discussed above, involve storing known good copies of firmware for any device (whether a security sensor or other electronic device) before the firmware update is installed. This may provide the control unit or other device implementing the method with a way to restore the relevant device to working condition if the installation fails or otherwise encounters errors.

Although the foregoing description contains many specifics, these should not be construed as limiting the scope of the invention or of any of the appended claims, but merely as providing information pertinent to some specific embodiments that may fall within the scopes of the invention and the appended claims. Features from different embodiments may be employed in combination. In addition, other embodiments of the invention may also be devised which lie within the scopes of the invention and the appended claims. The scope of the invention is, therefore, indicated and limited only by the appended claims and their legal equivalents. All additions, deletions and modifications to the invention, as disclosed herein, that fall within the meaning and scopes of the claims are to be embraced by the claims.

What is claimed is:

1. A control unit for a security system, the control unit comprising:
a processor;
memory in electronic communication with the processor; and
instructions stored in the memory and executable by the processor to cause the control unit to:
receive, from a remote server, firmware to be installed on a first electronic device of a plurality of electronic devices of the security system;
determine that the security system is unarmed during a first time period;
send the firmware to the first electronic device based at least in part on the determining; and
initiate installation of the firmware on the first electronic device by providing a first predetermined installation time during the first time period in which the security system is unarmed,
wherein, when the security system is unarmed, the control unit is configured to receive an alarm condition message from a sensor of the plurality of electronic devices without generating an alarm.

2. The control unit of claim 1, wherein the instructions are further executable by the processor to cause the control unit to:
send the firmware to a second electronic device; and
initiate installation of the firmware on the second electronic device by providing a second predetermined installation time during the first time period in which the security system is unarmed.

3. The control unit of claim 2, wherein the instructions to initiate installation of the firmware are executable to cause the control unit to:
initiate installation of the firmware on the second electronic and initiate installation of the firmware on the first electronic device during an overlapping portion of the first time period in which the security system is unarmed.

4. The control unit of claim 2, wherein the instructions to initiate installation of the firmware are executable to cause the control unit to:
initiate installation of the firmware on the first electronic device and initiate installation of the firmware on the second electronic device at a same rate.

5. The control unit of claim 2, wherein the instructions are further executable by the processor to cause the control unit to:
send instructions for the first electronic device and the second electronic device to shut down during an overlapping portion of a second time period.

6. The control unit of claim 2, wherein the instructions are further executable by the processor to cause the control unit to:

send instructions to the first electronic device and the second electronic device to restart during an overlapping portion of a third time period.

7. The control unit of claim 2, wherein the instructions are further executable by the processor to cause the control unit to:
  send instructions for the first electronic device and the second electronic device to shut down at a same time; and
  send instructions to the first electronic device and the second electronic device to restart at a same time.

8. The control unit of claim 2, wherein the firmware sent to the first electronic device comprises a first firmware and the firmware sent to the second electronic device comprises a second firmware different from the first firmware.

9. The control unit of claim 8, wherein the first firmware installed on the first electronic device comprises a first initial firmware, and the second firmware installed on the second electronic device comprises a second initial firmware, wherein the instructions are further executable by the processor to cause the control unit to:
  receive, from the remote server, a first firmware update to be installed on the first electronic device and a second firmware update to be installed on the second electronic device;
  determine that the security system is unarmed during a second time period;
  send the first firmware update to the first electronic device and the second firmware update to the second electronic device based at least in part on the determining; and
  initiate synchronized installation of the first firmware update on the first electronic device and of the second firmware update on the second electronic device based on a predetermined installation time during the second time period.

10. The control unit of claim 9, wherein the instructions are further executable by the processor to cause the control unit to:
  receive a signal that installation of at least one of the first firmware update or the second firmware update was unsuccessful; and
  send a command, based at least in part on the received signal, to at least one of the first electronic device or the second electronic device to restore at least one of the first initial firmware or the second initial firmware.

11. The control unit of claim 10, wherein the instructions are further executable by the processor to cause the control unit to:
  send a report to a remote server that installation of at least one of the first firmware update or the second firmware update was unsuccessful; and
  receive a message from the remote server that the at least one of the first firmware update or the second firmware update is faulty based at least in part on the sending the report.

12. The control unit of claim 1, wherein the sending the firmware to the first electronic device occurs before the first time period, wherein the instructions are further executable by the processor to cause the control unit to:
  determine a first amount of time after the sending the firmware to the first electronic device until the first predetermined installation time; and
  send a command to the first electronic device to wait the first amount of time before initiating installation of the firmware.

13. The control unit of claim 1, wherein the instructions are further executable by the processor to cause the control unit to:
  locally store the firmware prior to sending the firmware to the first electronic device;
  determine that the security system is unarmed during a second time period different from the first time period;
  resend, based at least in part on the determining, the stored firmware to the first electronic device if installation of the firmware on the first electronic device was unsuccessful; and
  initiate installation of the locally stored firmware on the first electronic device by providing a predetermined installation time during the second time period in which the security system is unarmed.

14. The control unit of claim 1, wherein the instructions are further executable by the processor to cause the control unit to:
  locally save a plurality of firmware versions;
  send a message to a user that indicates an unsuccessful installation of the firmware and the locally saved plurality of firmware versions; and
  send a firmware version of the plurality of firmware versions to the first electronic device based at least in part on a selection by the user of the firmware version for installation on the first electronic device.

15. A method comprising:
  receiving, from a remote server, firmware to be installed on a first electronic device of a plurality of electronic devices of a security system;
  determining that the security system is unarmed during a first time period;
  sending the firmware to the first electronic device based at least in part on the determining; and
  initiating installation of the firmware on the first electronic device by providing a first predetermined installation time during the first time period in which the security system is unarmed,
  wherein, when the security system is unarmed, a control unit is configured to receive an alarm condition message from a sensor of the plurality of electronic devices without generating an alarm.

16. The method of claim 15, further comprising:
  sending the firmware to a second electronic device; and
  initiating installation of the firmware on the second electronic and initiate installation of the firmware on the first electronic device during an overlapping portion of the first time period in which the security system is unarmed.

17. The method of claim 15, further comprising:
  sending instructions to the first electronic device and the second electronic device to restart during an overlapping portion of the first time period.

18. The method of claim 15, further comprising:
  sending instructions to the first electronic device and the second electronic device to restart at a same time.

19. A non-transitory computer-readable storage medium storing code for communication, the code comprising instructions executable by a processor to:
  receive, from a remote server, firmware to be installed on a first electronic device of a plurality of electronic devices of the security system;
  determine that the security system is unarmed during a first time period;
  send the firmware to the first electronic device based at least in part on the determining; and initiate installation of the firmware on the first electronic device by providing a first predetermined installation time during the first time period in which the security system is unarmed, wherein, when the security system is unarmed, a control unit is configured to receive an alarm condition message from a sensor of the plurality of electronic devices without generating an alarm.

20. The non-transitory computer-readable medium of claim 19, wherein the instructions are further executable by the processor to:

send the firmware to a second electronic device; and initiate installation of the firmware on the second electronic and initiate installation of the firmware on the first electronic device during an overlapping portion of the first time period in which the security system is unarmed.

* * * * *